United States Patent [19]
Flanagan et al.

[11] Patent Number: 6,141,334
[45] Date of Patent: Oct. 31, 2000

[54] RECEIVER FOR PILOT-AIDED CODE-DIVISION MULTIPLE ACCESS

[75] Inventors: Michael Joseph Flanagan, Chester, N.J.; Klaus Ingemann Pedersen, Aalborg, Denmark

[73] Assignee: Lucent Technologies, Inc., Murray Hill, N.J.

[21] Appl. No.: 08/980,321

[22] Filed: Nov. 28, 1997

Related U.S. Application Data

[60] Provisional application No. 60/037,583, Feb. 10, 1997.

[51] Int. Cl.$^7$ .............................. H04B 7/216; H04B 1/69
[52] U.S. Cl. ........................................... 370/342; 375/130
[58] Field of Search .................................. 370/335, 342, 370/320, 427, 360, 441, 203; 375/200, 206, 349, 347, 348, 130

[56] References Cited

U.S. PATENT DOCUMENTS

| | | | |
|---|---|---|---|
| 5,428,602 | 6/1995 | Kemppainen | 370/330 |
| 5,621,752 | 4/1997 | Antonio et al. | 375/200 |
| 5,648,968 | 7/1997 | Reudink | 370/335 |
| 5,920,552 | 7/1999 | Allpress et al. | 370/335 |
| 5,930,288 | 7/1999 | Eberhardt | 375/200 |

OTHER PUBLICATIONS

*CDMA: Principals of Spread Spectrum Communication*, Andrew J. Viterbi, Addison–Wesley Publishing Company, 1995, pp. 87–96.

*Primary Examiner*—Ajit Patel
*Assistant Examiner*—Brian Nguyen
*Attorney, Agent, or Firm*—DeMont & Breyer, LLC; Jason Paul DeMont; Wayne S. Breyer

[57] ABSTRACT

A pilot-aided rake receiver suitable for CDMA wireless telecommunications is disclosed. Some rake receivers in accordance with the present invention require fewer computational resources to be consumed by the conjugate pilot estimate multipliers than some pilot-aided rake receivers in the prior art. One embodiment of the present invention comprises: N rake receiver fingers, wherein each of the N rake receiver fingers outputs an information-bearing signal, $I_i(n)$, and a conjugate pilot estimate, $P_i(n)$; N multipliers; and an N×N switch interposed between the N rake receivers and the N multipliers for routing the information-bearing signal, $I_i(n)$, and the conjugate pilot estimate, $P_i(n)$, from any of the N rake receiver fingers to any of the N multipliers. In some embodiments of the present invention, the N multipliers are pooled and shared by the resources (e.g., rake receiver fingers, coherent combiners, etc.) associated with a plurality of users.

21 Claims, 8 Drawing Sheets

100

RECEIVER FOR PILOT-AIDED CODE-DIVISION MULTIPLE ACCESS

CROSS-REFERENCE TO RELATED APPLICATIONS

This application claims the benefit of U.S. Provisional application Ser. No. 60/037,583, filed Feb. 10, 1997 and entitled "Adaptive Receiver for Pilot-Aided Code Division Multiplexed Access (CDMA) Signals."

FIELD OF THE INVENTION

The present invention relates to wireless telecommunications equipment in general, and, more particularly, to an for a pilot-aided code-division multiple access ("CDMA") radio receiver.

BACKGROUND OF THE INVENTION

FIG. 1 depicts a schematic diagram of a portion of a typical wireless telecommunications system, which provides wireless telecommunications service to a number of wireless terminals (e.g., wireless terminals 101-1 through 101-3) that are situated within a geographic region. The heart of a typical wireless telecommunications system is Wireless Switching Center ("WSC") 120, which may be also known as a Mobile Switching Center ("MSC") or Mobile Telephone Switching Office ("MTSO"). Typically, Wireless Switching Center 120 is connected to a plurality of base stations (e.g., base stations 103-1 through 103-5) that are dispersed throughout the geographic area serviced by the system and to the local- and long-distance telephone offices (e.g., local-office 130, local-office 138 and toll-office 140). Wireless Switching Center 120 is responsible for, among other things, establishing and maintaining calls between wireless terminals and between a wireless terminal and a wireline terminal, which wireline terminal is connected to Wireless Switching Center 120 via the local and/or long-distance networks.

The geographic area serviced by a wireless telecommunications system is divided into spatially distinct areas called "cells." As depicted in FIG. 1, each cell is schematically represented by a hexagon; in practice, however, each cell has an irregular shape that depends on the topography of the terrain surrounding the cell. Typically, each cell contains a base station, which comprises the radios and antennas that the base station uses to communicate with the wireless terminals in that cell and also comprises the transmission equipment that the base station uses to communicate with Wireless Switching Center 120.

For example, when wireless terminal 101-1 desires to communicate with wireless terminal 101-2, wireless terminal 101-1 transmits the desired information to base station 103-1, which relays the information to Wireless Switching Center 120. Upon receipt of the information, and with the knowledge that it is intended for wireless terminal 101-2, Wireless Switching Center 120 then returns the information back to base station 103-1, which relays the information, via radio, to wireless terminal 101-2.

Typically, the signal transmitted by a wireless terminal to a base station is radiated omni-directionally from the wireless terminal. Although some of the signal that is transmitted radiates in the direction of the base station and reaches the base station in a direct, line-of-sight path, if one exists, most of the transmitted signal radiates in a direction other than towards the base station and is never received by the base station. Often, however, signals that radiate initially in a direction other than towards the base station strike an object, such as a building, and are reflected towards the base station. Thus, a signal can radiate from the wireless terminal and be received by the base station via multiple signal paths.

FIG. 2 depicts an illustration of wireless terminal 101-1 as it transmits to base station 103-1. Signal 107-1 is received by base station 103-1 directly via a line-of-sight path. Signal 107-2, signal 107-3 and signal 107-4 arrive at base station 103-1 after radiating initially in a direction other than towards base station 103-1 and only after reflecting off of an object, such as buildings 105-2 through 105-4, respectively. Signals 108-1 through 108-4 radiate from wireless terminal 101-1 but never reach base station 103-1.

Because each of the four signals arrives at base station 103-1 after having traveled a different path, each of the four signals arrives at different times and interfere to form a composite of the four constituent signals. This is known as the multipath phenomenon. And furthermore, depending on the length of the path traveled and whether the signal is reflected off of an object before reaching base station 103-1, the signal quality (as measured by, for example, the average power of an amplitude-modulated signal, the signal-to-noise ratio, absolute power in dBm, etc.) of each signal is different when received. This is partially due to the fact that when a signal is reflected off of an object, the extent to which the signal is attenuated is a function of, among other things, the angle at which the signal is incident to the object and the geometric and dielectric properties of the object.

In a code-division multiple access ("CDMA") wireless telecommunications system each radio receiver endeavors to identify and isolate the highest-quality constituent signals in the composite multipath signal and to demodulate and combine them to form an estimate of the transmitted signal. As is well-known in the prior art, this process is conducted with, among other things, a rake receiver. A rake receiver analyzes a composite signal, in well-known fashion, and attempts to identify the strongest constituent signals in the composite signal. The rake receiver then isolates and demodulates each of the strongest constituent signals, and then combines them, in well-known fashion, to produce a better estimate of the transmitted signal than could be obtained from any single constituent signal. To accomplish this, a rake receiver comprises a plurality, but finite number, of "fingers," each of which isolates and demodulates one constituent signal.

Because each constituent signal travels a different path from the transmitter to the receiver, it is highly unlikely that the distance traveled by all of the constituent signals will be exactly the same. Any discrepancy is manifested as a relative time-delay, or phase-shift, in the constituent signals. Any phase-shift in a constituent signal that does not exactly equal an integral number of wavelengths of the carrier signal is manifested by a partial phase rotation in the constituent signal with respect to the other constituent signals.

When the modulation scheme of the transmitted signal does not function by modulating the phase of the carrier, the partial phase rotation of the constituent signals at the receiver is irrelevant and does not affect the demodulation process. In contrast, when the modulation scheme of the transmitted signal functions, at least in part, by modulating the phase of the carrier signal (e.g., quadrature phase-shift keying, quadrature-amplitude modulation, etc.), the partial phase rotation of the respective signals must be considered in the demodulation process. Typically, the partial phase rotation of the respective signals is accounted for by re-aligning their phase, which makes quasi-coherent combination of the constituent signals possible.

In the prior art, one technique has been developed, called "pilot-aided CDMA," to facilitate the task of re-aligning the phase of the respective constituent signals. In a pilot-aided CDMA system a pilot signal is transmitted in the same channel as the information-bearing signal. Typically, the pilot signal has the same frequency as the information-bearing signal but has an invariant phase. The pilot signal is subject to the same environmental factors as the information-bearing signal as it traverses each path from the transmitter to the receiver, and, therefore, the multipath phenomenon acts on the pilot-signal in the same fashion as the information-bearing signal to ensure that a constituent pilot signal arrives at the receiver with each constituent information-bearing signal. Because each constituent pilot signal traverses the same path as its associated constituent information-bearing signal, each constituent pilot signal experiences the same phase rotation at the receiver as the associated constituent information-bearing signal. And because the rake receiver knows that the phase of the pilot signal, as transmitted, is invariant, the rake receiver can estimate the relative phase rotation of the respective constituent pilot signals, and can, therefore, estimate the phase rotation in each constituent information-bearing signal.

In a pilot-aided CDMA system in the prior art, the task of phase aligning the respective constituent information-bearing signals is performed by multiplying each constituent information-bearing signal by a factor called the "conjugate pilot estimate." The conjugate pilot estimate is created by the rake receiver based on the relative phase rotation of the constituent pilot signals. The products of each constituent information-bearing signal—conjugate pilot estimate pair are, therefore, phase-aligned, which enables quasi-coherent combination, in well-known fashion, and the estimation of the originally transmitted information-bearing signal.

Pilot-aided CDMA is well-known in the prior art and the reference *CDMA: Principals of Spread Spectrum Communication,* Andrew J. Viterbi, Addison-Wesley Publishing Company, 1995, pp. 87–96, is a typical reference on the topic.

FIG. 3 depicts a block diagram of the salient components in an pilot-aided CDMA receiver in the prior art. CDMA receiver 300 comprises: antenna 301, radio front-end 302 and rake receiver 305. Rake receiver 305 typically comprises a bank of N fingers, 307-1 through 307-N, each of which outputs a constituent information-bearing signal, $I_i(n)$, and an associated conjugate pilot estimate, $P_i(n)$, for i=1 to N, wherein n indicates the temporal sequence of the received signals. Each constituent information-bearing signal, $I_i(n)$, and its associated conjugate pilot estimate, $P_i(n)$, are multiplied by a conjugate pilot multiplier, and quasi-coherently combined by combiner 312, in well-known fashion, to provide an estimate, $Î(n)$, of the originally transmitted information-bearing signal.

SUMMARY OF THE INVENTION

Although pilot-aided rake receivers offer undoubted advantages over non-pilot-aided rake receivers, some pilot-aided rake receivers in the prior art are prohibitively expensive to fabricate because they require extensive computational resources (e.g., hardware, CPU cycles, etc.). Therefore, the need exists for a more economical pilot-aided rake receiver.

In a pilot-aided rake receiver in the prior art, the conjugate pilot multipliers, which perform the multiplication of the information-bearing signals by their associated conjugate pilot estimates, are the principal determinants in the cost of the receiver. This is particularly true as the number of fingers in the rake receiver increases.

In general, it is not inherently difficult to reduce the cost of the conjugate pilot multipliers, or to use inexpensive conjugate pilot multipliers in a rake receiver. Rather, the difficulty lies in making a pilot-aided rake receiver with inexpensive conjugate pilot multipliers in such a manner that the performance of the rake receiver is not impaired.

The cost of a conjugate pilot multiplier can be reduced by lowering the capacity of the multiplier, which is based on the number of bits that the multiplier is capable of multiplying. For example, a multiplier that multiplies an 8-bit multiplicand by an 8-bit multiplier is generally more expensive than a multiplier that multiplies a 4-bit multiplicand by a 4-bit multiplier. If, however, a pilot-aided rake receiver simply uses smaller conjugate pilot multipliers, the fidelity of all of the multiplier products will be coarsened, all of the inputs to the coherent combination process will be less precise, and the integrity of the rake receiver will be impaired.

The fidelity of each of the constituent information-bearing signals arriving at the receiver is not identical, however, and although all of the bits in the most accurate information-bearing signal should be included in the coherent combination process, the least significant bits in the least accurate information-bearing signal are less reliable and can be omitted from the coherent combination process without impairing the integrity of the rake receiver. This means that the least significant bits in the less accurate information-bearing signals, $I_i(n)$, and/or the least significant bits in the associated conjugate pilot estimates, $P_i(n)$, can be omitted from the conjugate pilot multiplication. If they can be omitted from the conjugate pilot multiplication, then a smaller capacity, and therefore less expensive, conjugate pilot multiplier can be used for that multiplication. This does not imply that small conjugate pilot multipliers can be used uniformly throughout the rake receiver, but only that they can be used selectively.

The result is that an array of identical full-capacity conjugate pilot multipliers in a pilot-aided rake receiver in the prior art can be replaced with an array of conjugate pilot multipliers of varying capacity or variable capacity or both and a mechanism that ensures that the more accurate information-bearing signals and associated conjugate pilot estimates are multiplied by higher capacity multipliers than the less accurate information-bearing signals. And furthermore, as the relative quality of the constituent information-bearing signals varies, the receiver adapts and changes the capacity with which each of the constituent information-bearing signals is multiplied.

One illustrative embodiment of the present invention comprises: N rake receiver fingers, wherein each of the N rake receiver fmgers outputs an information-bearing signal, $I_i(n)$, and a conjugate pilot estimate, $P_i(n)$; N multipliers; and an N×N switch interposed between the N rake receivers and the N multipliers for routing the information-bearing signal, $I_i(n)$, and the conjugate pilot estimate, $P_i(n)$, from any of the N rake receiver fingers to any of the N multipliers.

DETAILED DESCRIPTION

Three different embodiments of the present invention are described in detail below, and each embodiment is chosen for pedagogical purposes to highlight one or more aspects of the present invention. Therefore, it is to be understood that the following embodiments are merely illustrative of the present invention and that many variations of the present invention can be devised by those skilled in the art based on the illustrative embodiments without departing from the scope of the present invention. It is therefore intended that such variations be included within the scope of the following claims.

The three illustrative embodiments are characterized by:
(1) Pooled Multipliers;
(2) Partially Pooled Multipliers; and
(3) Reconfigurable Multipliers.

Each of the three illustrative embodiments will be described, in turn, below.

Illustrative Embodiment #1—Pooled Multipliers

Figure 1:
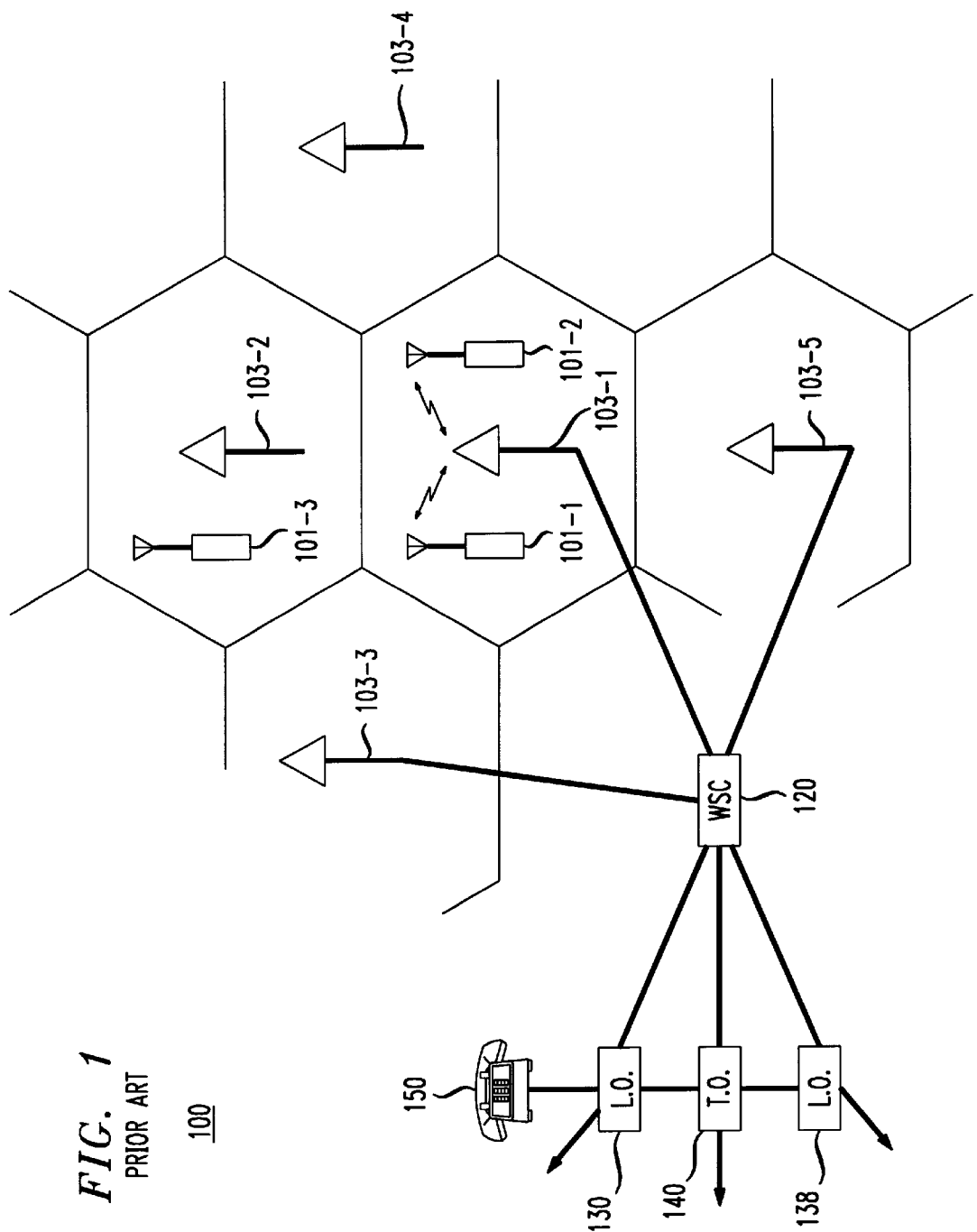
FIG. 1 depicts a schematic diagram of a wireless telecommunications system in the prior art.
Figure 2:
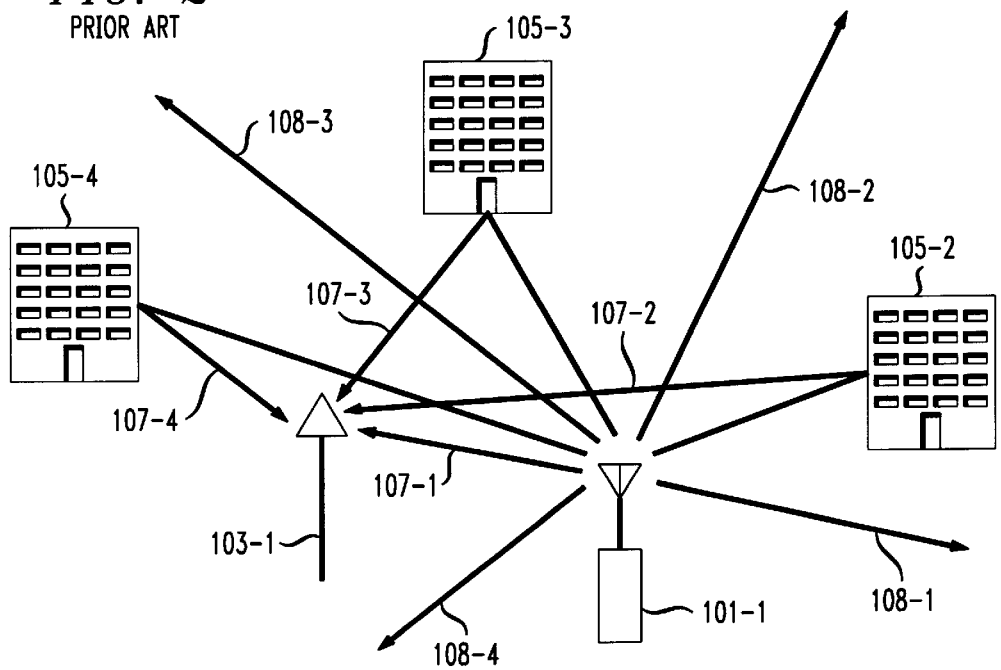
FIG. 2 depicts a schematic diagram of a wireless base station which is receiving a multipath signal as transmitted by a wireless terminal, in the prior art.
Figure 3:
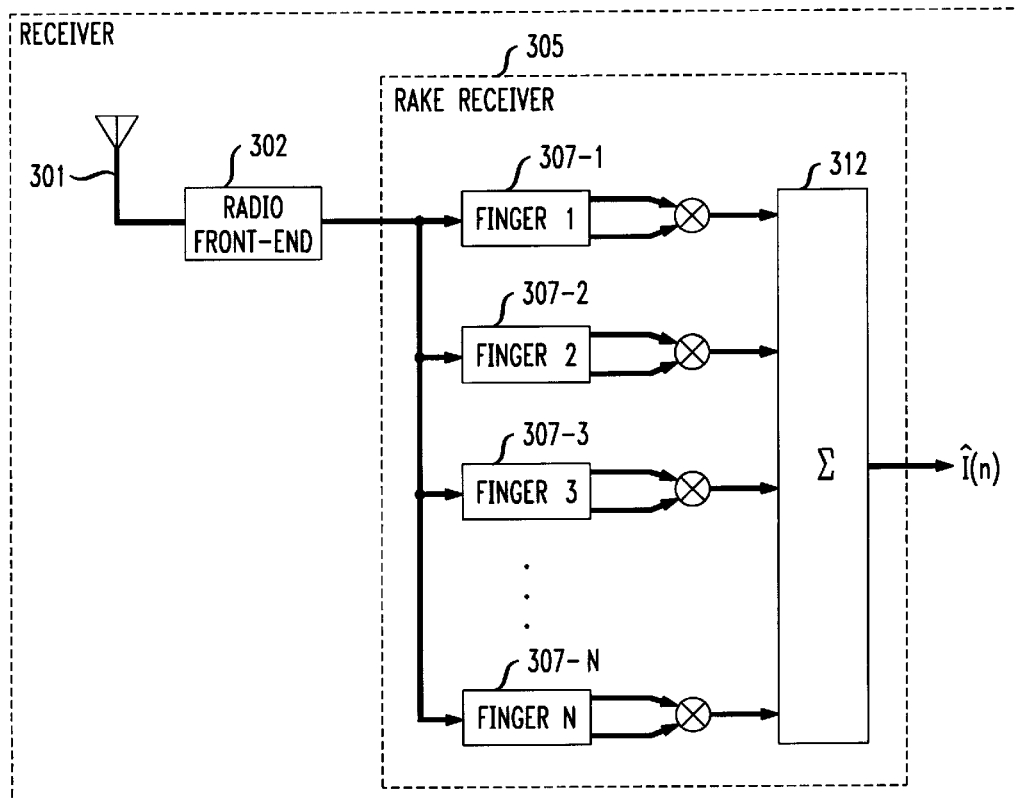
FIG. 3 depicts a block diagram of a pilot-aided CDMA rake receiver, in the prior art.
Figure 4:
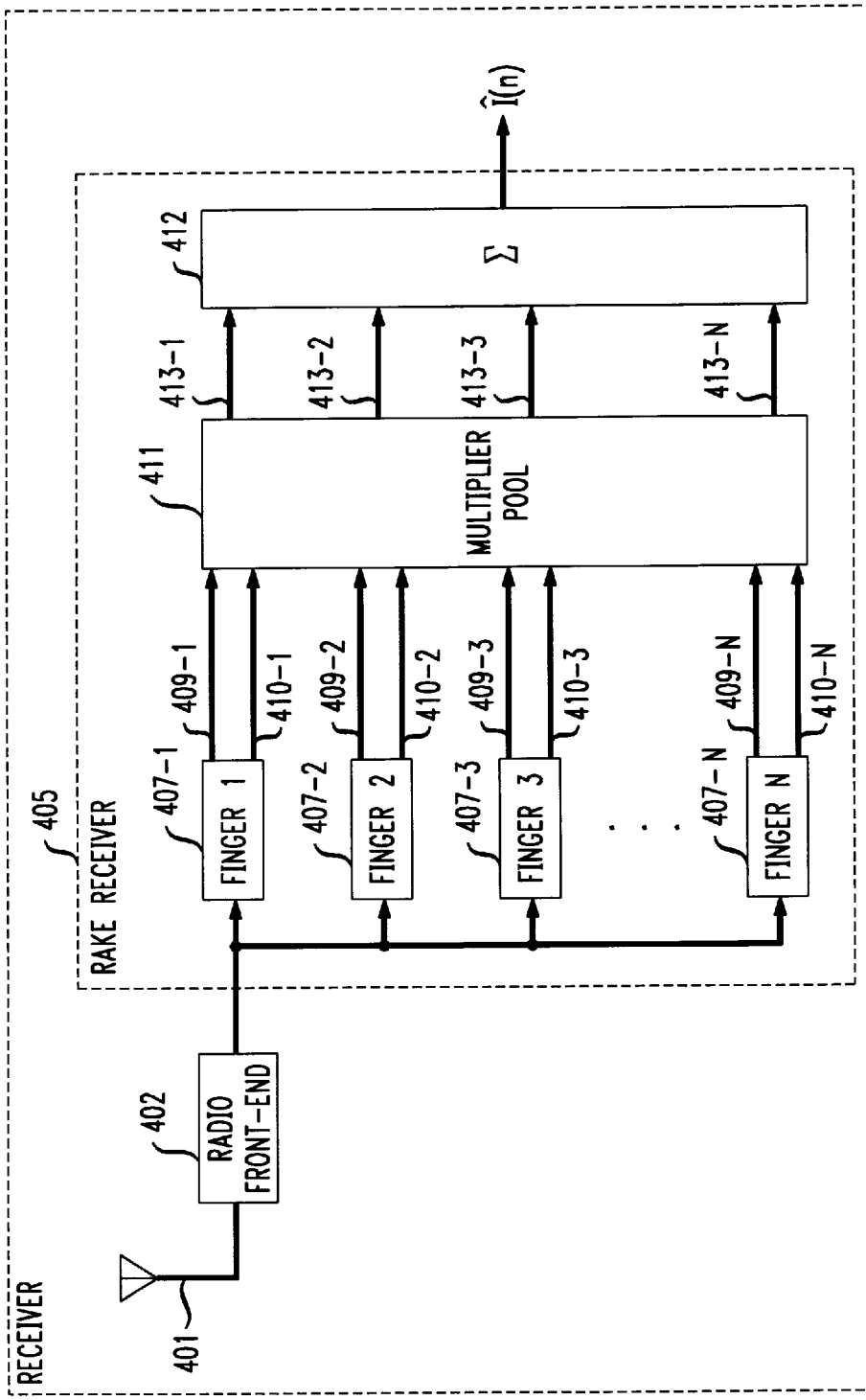
FIG. 4 depicts a block diagram of a pilot-aided CDMA rake receiver in accordance with the first illustrative embodiment of the present invention.

FIG. 4 depicts receiver 400 in accordance with the first illustrative embodiment of the present invention, which can be implemented in either a wireless terminal or in a wireless base station. Receiver 400 advantageously comprises: antenna 401, radio front-end 402 and rake receiver 405, which comprises: a bank of N rake receiver fmgers, 407-1 through 407-N, multiplier pool 411 and coherent combiner 412, interconnected as shown.

Antenna 401 advantageously receives a pilot-aided composite signal, in well-known fashion, and feeds the composite signal to radio front-end 402, which amplifies and down-converts it, in well-known fashion. The composite signal leaves radio front-end 402 and is received by rake receiver 405, which analyzes the composite signal, in well-known fashion, and assigns each of the strongest constituent signals in the composite signal to one of the N rake receiver fingers, 407-1 through 407-N. It will be clear to those skilled in the art how to determine how many rake receiver fingers a rake receiver should have depending on the application for which the receiver is intended.

Each of the N rake receiver fingers advantageously outputs an information-bearing signal, $I_i(n)$, and a conjugate pilot estimate, $P_i(n)$, in well-known fashion, for i=1 to N, wherein n indicates the temporal sequence of the received signals. In other words, information-bearing signal $I_1(n)$ and conjugate pilot estimate, $P_1(n)$, are output from rake receiver finger 407-1 after information-bearing signal $I_1(n-1)$ and conjugate pilot estimate, $P_1(n-1)$ and before information-bearing signal $I_1(n+1)$ and conjugate pilot estimate, $P_1(n+1)$. Rake receiver finger 407-i outputs its information-bearing signal, $I_i(n)$, on lead 409-i and its conjugate pilot estimate, $P_i(n)$, on lead 410-i, in well-known fashion.

In the illustrative embodiment, the information-bearing signals, $I_i(n)$, and conjugate pilot estimates, $P_i(n)$, are typically complex numbers, which have real and imaginary components, and both the real and imaginary components for both the information-bearing signals, $I_i(n)$, and the conjugate pilot estimates, $P_i(n)$ are output from each finger with the same precision. For example, each rake receiver finger 407-i advantageously outputs an information-bearing signal, $I_i(n)$, with an 8-bit real component and an 8-bit imaginary component and a conjugate pilot estimate, $P_i(n)$, with an 8-bit real component and an 8-bit imaginary component.

Multiplier pool 411 takes as input the N pairs of information-bearing signals, $I_i(n)$, and conjugate pilot estimates, $P_i(n)$, multiplies them, or at least parts of them, and outputs their respective products via levels 413-1 through 413-N, to to coherent combiner 412, where coherent combiner 412 combines the products, in well-known fashion, to produce an estimate, $Î(n)$, of the transmitted signal.

Figure 5:
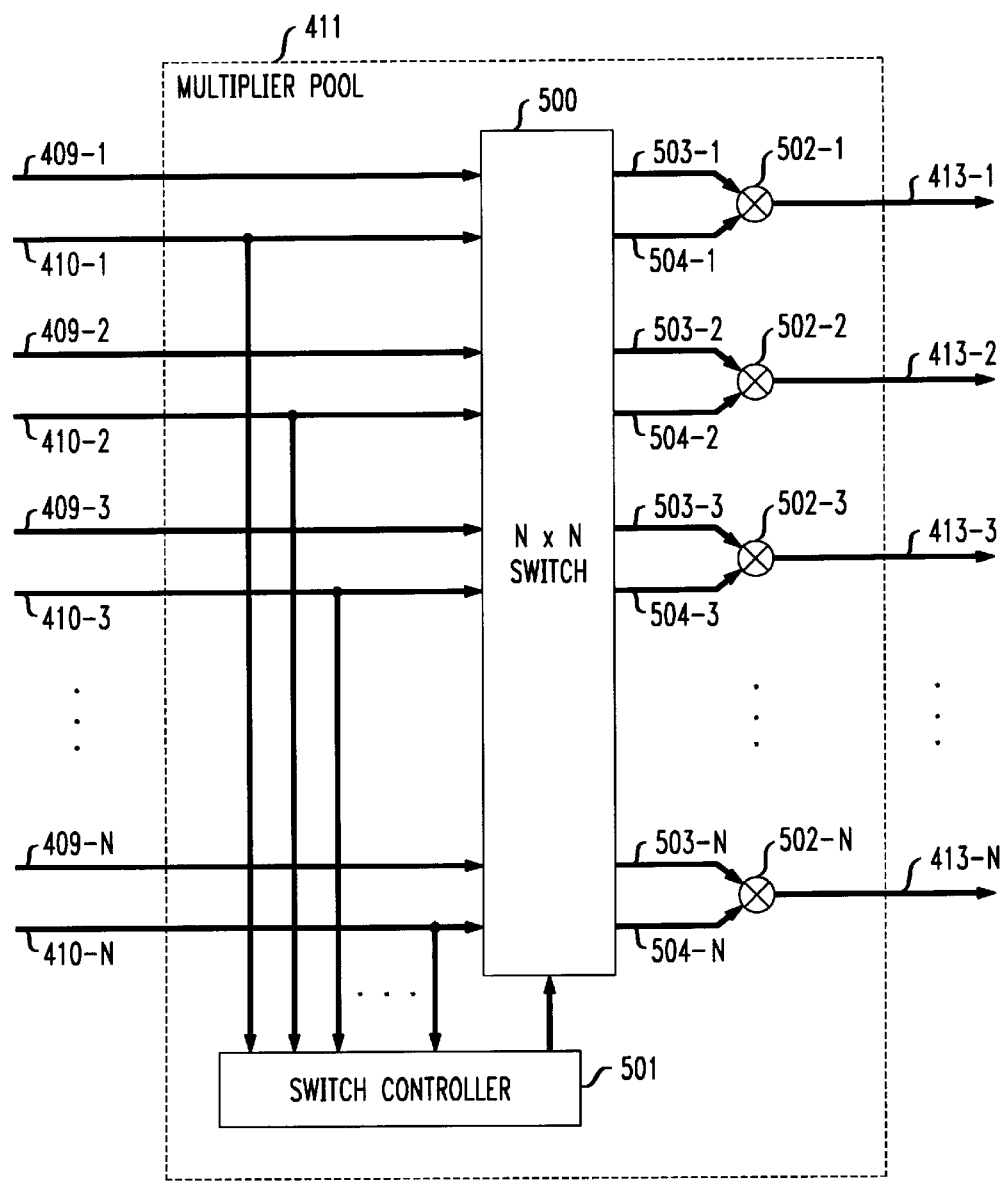
FIG. 5 depicts a block diagram of a multiplier pool in accordance with the pilot-aided CDMA rake receiver of FIG. 4.

FIG. 5 depicts a block diagram of the salient components of multiplier pool 411, which advantageously comprises: N×N switch 500, switch controller 501, and N multipliers, 502-1 through 502-N, interconnected as shown. N×N switch 500 is advantageously capable of routing any information-bearing signal, $I_i(n)$, and conjugate pilot estimate, $P_i(n)$, pair from any of the N rake receiver fingers to any of the N multipliers, in well-known fashion. N×N switch 500 could be, for example, a space-division switch, a time-division switch or any combination of space-division and time-division switches, in well-known fashion.

Each of the N multipliers, 502-1 through 502-N, advantageously has a capacity (e.g., 8+8×8+8 bits, 8+8×4+4 bits, 4+4×4+4 bits, etc.) to multiply two complex numbers (i.e., a number comprising both real and imaginary components). For example, a conjugate pilot multiplier with an 8+8×4+4 bit capacity is capable of multiplying a multiplicand with an 8-bit real component plus an 8-bit imaginary component by a multiplier with a 4-bit real component plus a 4-bit imaginary component. It will be clear to those skilled in the art that conjugate pilot multiplication involves complex numbers and it will be clear to those skilled in the art how to make and use a conjugate pilot multiplier of any capacity.

Because the fidelity of all N of the information-bearing signals, $I_i(n)$, is not equal, the less accurate information-bearing signals can be multiplied with less precision than the more accurate information-bearing signals without compromising the integrity of rake receiver 405. This is significant because it enables the rake receiver to be fabricated with multipliers of disparate capacity.

In other words, although all of the bits of the real and imaginary components of the more accurate information-bearing signals should be multiplied by all of the bits of the real and imaginary components of the associated conjugate pilot estimates, only the more significant bits in the real and imaginary components of the less accurate information-bearing signals need be multiplied by the more significant bits in the real and imaginary components of the associated conjugate pilot estimates. Incorporating computational resources in the rake receiver to multiply the least significant bits of less accurate information-bearing signals by the least significant bits of the associated conjugate pilot estimate is generally unnecessary to the integrity of the rake receiver and unnecessarily increases the cost of the rake receiver. Therefore, the first illustrative embodiment of the present invention incorporates multipliers of different capacities and endeavors to multiply the more accurate information-bearing signals and conjugate pilot estimates by the higher capacity (i.e., more precise) multipliers. N×N switch 500 is used to route the more accurate information-bearing signals and conjugate pilot estimates to the higher capacity multipliers and switch controller 501 endeavors to identify the more accurate information-bearing signals and to control N×N switch 500.

For example, when rake receiver 405 has N=6 fingers, the capacity of the 6 fingers for one variation of the present invention is shown in Table 1.

TABLE 1

| Multiplier 502-i | Capacity |
| --- | --- |
| 1 | 8 + 8 × 8 + 8 bits |
| 2 | 8 + 8 × 8 + 8 bits |
| 3 | 8 + 8 × 6 + 6 bits |
| 4 | 6 + 6 × 6 + 6 bits |
| 5 | 6 + 6 × 4 + 4 bits |
| 6 | 4 + 4 × 4 + 4 bits |

It will be clear to those skilled in the art that two 8+8×8+8 bit multipliers, one 8+8×6+6 bit multiplier, one 6+6×6+6 bit multiplier, one 6+6×4+4 bit multiplier, and one 4+4×4+4 bit multiplier consume fewer computational resources than six 8+8×8+8 bit multipliers, as might be found in a pilot-aided rake receiver in the prior art. Advantageously, the least significant bits of the products of the lower capacity multipliers are filled or "padded" with zeros, in well-known fashion, to preserve the relative significance of all of the bits in all of the products for presentation to coherent combiner 412.

Because not all of the information-bearing signal-conjugate pilot estimate pairs are multiplied with the same precision, switch controller 501 advantageously endeavors to ensure that those information-bearing signal-conjugate pilot estimate pairs with more fidelity are routed through N×N switch 500, via leads 503-1 through 503-N and 504-1 through 504-N, to to the more precise multipliers, 502-1 through 502-N. Advantageously, switch controller 501 accepts as input all N of the conjugate pilot estimates on leads 410-1 through 410-N and analyzes them, in well-known fashion, to determine their relative fidelity.

For the reasons discussed above, the relative fidelity of each information-bearing signal can be reasonably and fairly estimated by analyzing its associated conjugate pilot estimate. Switch controller 501 then directs N×N switch 500 to route the most accurate information-bearing signal-conjugate pilot estimate pair to the most precise multiplier, the next most accurate information-bearing signal-conjugate pilot estimate pair to the next most precise multiplier, etc.

Furthermore, it will be clear to those skilled in the art that multipliers 502-1 through 502-N can be pooled among multiple users and the output of the multipliers routed to a coherent combiner associated with that user. When multipliers 502-1 through 502-N are pooled among multiple users, switch controller 501 can apportion the multipliers among the users based on, for example, a measure of the frame-error rate of the estimated signal, $\hat{I}(n)$, for each user, or the user's desired level of channel quality, or a combination of the two, etc. In some embodiments in which multipliers 502-1 through 502-N can be pooled among multiple users, a second N×N switch (not shown) is interposed between the multipliers and the respective combiners to ensure that the appropriate multiplier products are routed to the proper combiners. The second N×N switch advantageously performs the inverse routing of N×N switch 500 and can be also controlled by switch controller 501, in well-known fashion.

Illustrative Embodiment #2—Partially Pooled Multipliers

Figure 6:
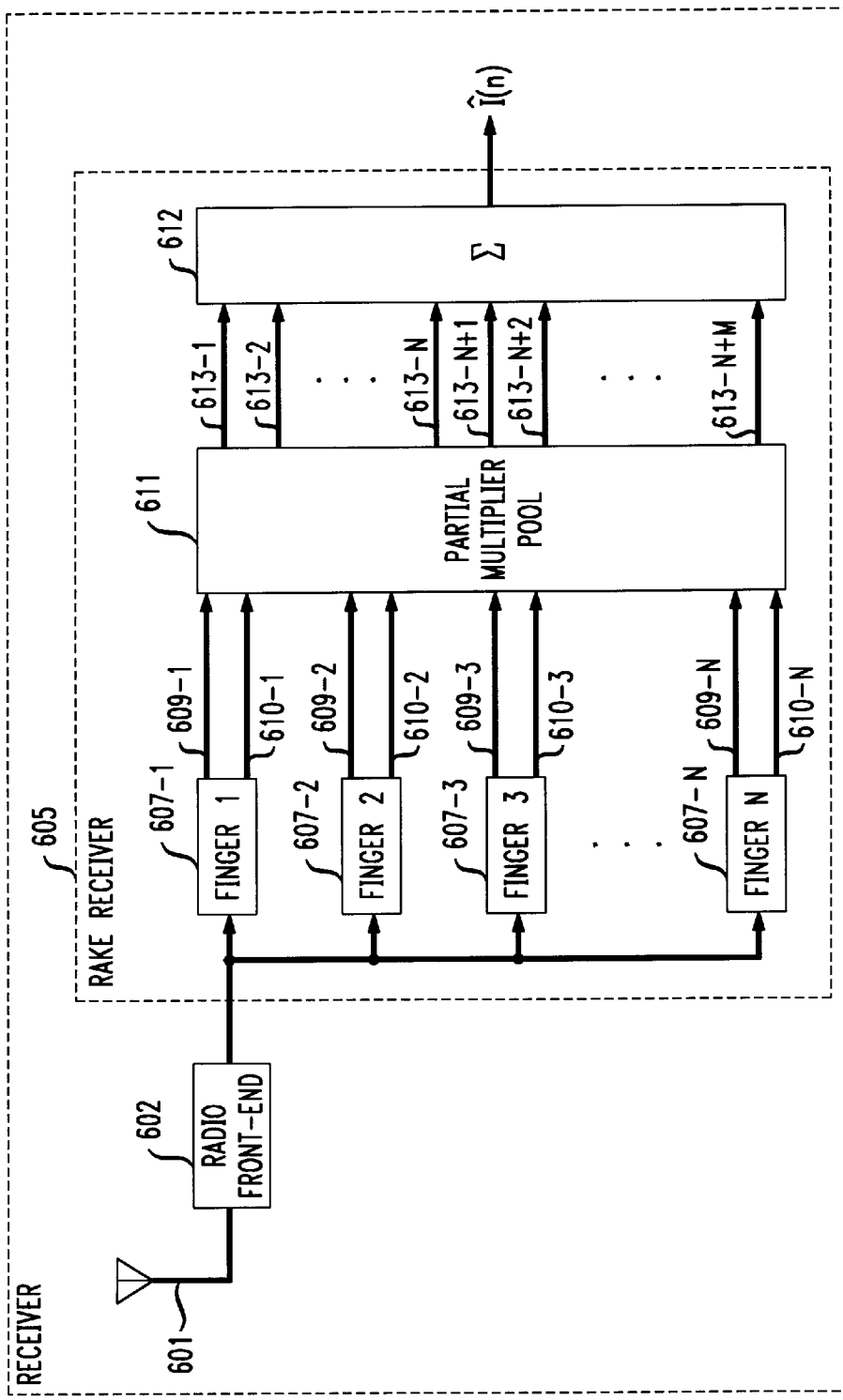
FIG. 6 depicts a block diagram of a pilot-aided CDMA rake receiver in accordance with the first illustrative embodiment of the present invention.

FIG. 6 depicts receiver 600 in accordance with the second illustrative embodiment of the present invention, which can be implemented in either a wireless terminal or in a wireless base station. Receiver 600 advantageously comprises: antenna 601, radio front-end 602 and rake receiver 605, which comprises: a bank of N rake receiver fingers, 607-1 through 607-N, partial multiplier pool 611 and coherent combiner 612, interconnected as shown.

Antenna 601 advantageously receives a composite signal, in well-known fashion, and feeds the composite signal to radio front-end 602, which amplifies and down-converts it, in well-known fashion. The composite signal leaves radio front-end 602 and is received by rake receiver 605, which analyzes the composite signal, in well-known fashion, and assigns each of the strongest constituent signals in the composite signal to one of the N rake receiver fmgers, 607-1 through 607-N, as in the first illustrative embodiment.

Each of the N rake receiver fmgers outputs an information-bearing signal, $I_i(n)$, and a conjugate pilot estimate, $P_i(n)$, in well-known fashion, for i=1 to N, wherein n indicates the temporal sequence of the received signals. Partial multiplier pool 611 takes as input the N pairs of information-bearing signals, $I_i(n)$, and conjugate pilot estimates, $P_i(n)$, multiplies them, or at least parts of them, and outputs their respective products to coherent combiner 612 via leads 613-1 through 613-N, where coherent combiner 612 combines the products, in well-known fashion, to produce the estimate, $\hat{I}(n)$, of the transmitted signal.

The idea underlying partially pooled multipliers is the observation that in the first illustrative embodiment the most significant bits of all of the information-bearing signals, $I_i(n)$, are multiplied by the most significant bits of the associated conjugate pilot estimate, $P_i(n)$, regardless of the estimated fidelity of the information-bearing signal, but only sometimes is the less significant bits of the information-bearing signals, $I_i(n)$, multiplied by the less significant bits of the associated conjugate pilot estimate, $P_i(n)$. Therefore, the most significant bits of all of the information-bearing signals, $I_i(n)$, can always multiplied by the most significant bits of the associated conjugate pilot estimate, $P_i(n)$, and need not be routed through N×N switch 500.

Furthermore, because multiplication is an associative function, the multiplicand or the multiplier or both can be resolved into its constituents and the constituents can be multiplied separately. For example, if C=c+d, then:

$$A \times C = A(c+d) = Ac + Ad \tag{Eq. 1}$$

which enables the multiplication of A×C to be performed with two smaller multiplications and the addition of the two partial products rather than one larger multiplication. Furthermore, if A=a+b, then:

$$A \times C = (a+b)(c+d) = ac + ad + bc + bd \tag{Eq. 2}$$

which enables the multiplication of A×C to be performed with four smaller multiplications and the addition of the four partial products and the addition of the four partial products rather than one larger multiplication. For example, if A=12 and C=25, then A can be resolved into a=10 and b=2 and C can be resolved into c=20 and d=5. Then according to Eq. 2 above, $$A \times C = ac+ad+bc+bd = 10*20+10*5+2*20+2*5 = 300 \quad \text{(Eq. 2a)}$$

In fact, Eq. 2 mimics the technique that most school children are taught for performing multiplication, which resolves the multiplication of two large numbers into the multiplication of pairs of small numbers plus the summation of the partial products. Furthermore, if A is resolved so that a represent the most significant bits of A and b represents the least significant bits of A, and C is resolved so that c represent the most significant bits of C and d represents the least significant bits of C, then the partial product ac represents the most significant partial product and bd represents the least significant partial product. Therefore, if A represents an information-bearing signal which is estimated to be highly accurate and C represents the associated conjugate pilot estimate, then an illustrative embodiment of the present invention would compute all four partial products, ac, ad, bc and bd and forward them to coherent combiner 612, which can combine them, in well-known fashion, to produce an estimate, Î(n), of the transmitted signal.

In contrast, if A represents an information-bearing signal which is estimated to be only moderately accurate and C represents the associated conjugate pilot estimate, then an illustrative embodiment of the present invention might compute only two of the partial products, ac and ad, which obviates the need for two 4+4×4+4 bit multiplications in comparison to a full multiplication and saves computational resources.

Furthermore, if A represents an information-bearing signal which is estimated to have only minimal accuracy and C represents the associated conjugate pilot estimate, then an illustrative embodiment of the present invention might compute only the most significant partial product, ac, which obviates the need for three 4+4×4+4 bit multiplications in comparison to a full multiplication.

Figure 7:
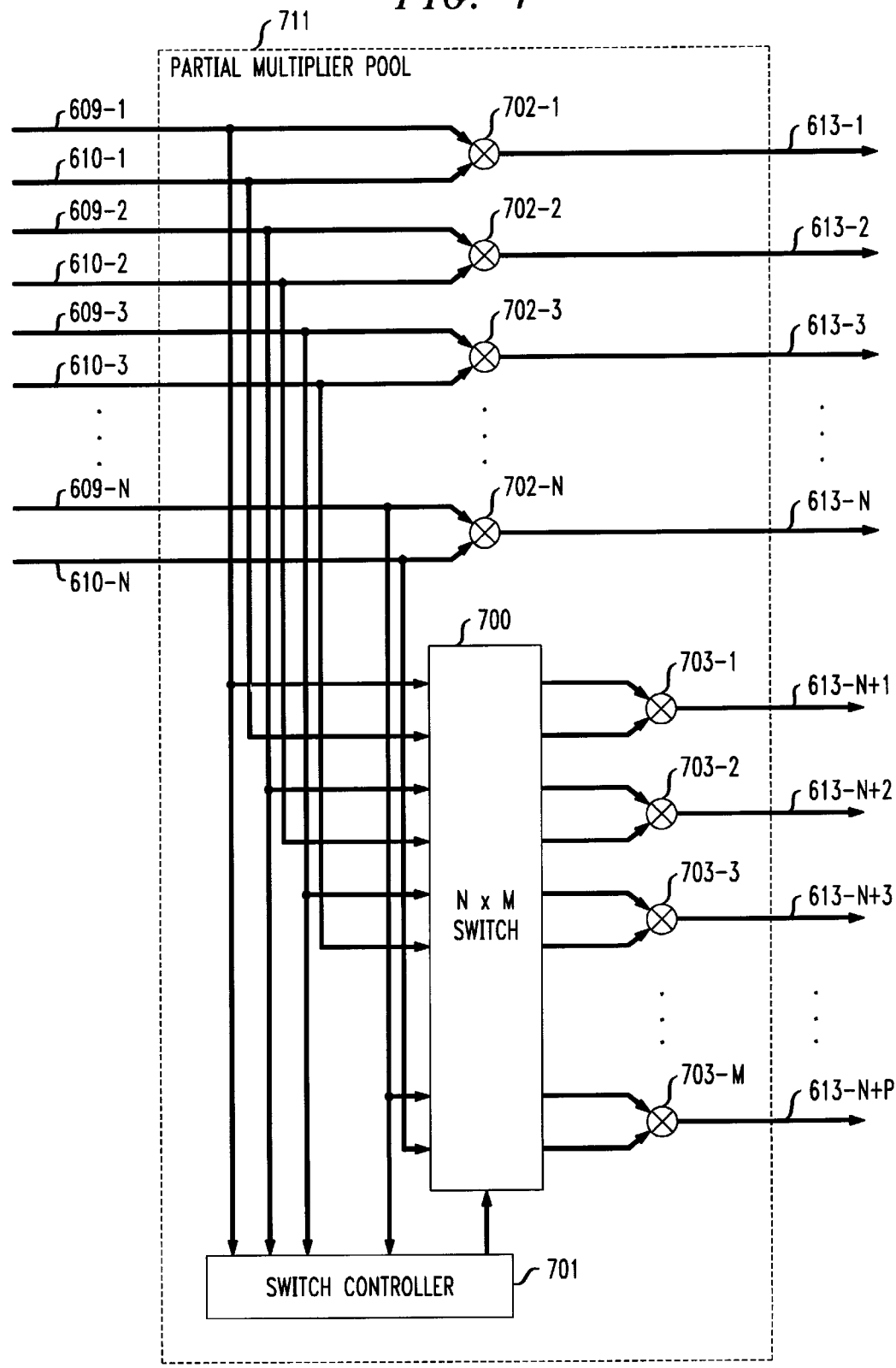
FIG. 7 depicts a block diagram of a partial multiplier pool in accordance with the pilot-aided CDMA rake receiver of FIG. 6.

FIG. 7 depicts a block diagram of the salient components of partial multiplier pool 611, which implements a simple case of the above-described technique. Partial multiplier pool 611 advantageously comprises: N multipliers, 702-1 through 702-N, N×M switch 700, switch controller 701, and M pooled multipliers, 703-1 through 703-M, interconnected as shown. In the illustrative embodiment, partial multiplier pool 411 receives the information-bearing signals, $I_i(n)$, and the associated conjugate pilot estimates, $P_i(n)$. All of the bits of the information-bearing signals, $I_i(n)$, are provided to one of the N multipliers, 702-1 through 702-N, but only the most significant bits of the associated conjugate pilot estimates, $P_i(n)$ are provided to the N multipliers, 702-1 through 702-N.

For example, if the information-bearing signals, $I_i(n)$, each comprise a real component of 8 bits and an imaginary component of 8 bits, and the associated conjugate pilot estimates, $P_i(n)$, each comprise a real component of 8 bits and an imaginary component of 8 bits, then all 8 bits of the real component and all 8 bits of the imaginary component of the information-bearing signals, $I_i(n)$, are provided to multipliers, 702-1 through 702-N, but only the 4 most significant bits of the real component and only the 4 most significant bits of the imaginary component are provided to multipliers, 702-1 through 702-N.

Each of the N multipliers, 702-1 through 702-N, advantageously has the same capacity, 8+8×4+4 bits.

Advantageously, all of the bits of the information-bearing signals, $I_i(n)$, are provided to N×M switch 700, but only the least significant bits of the associated conjugate pilot estimates, $P_i(n)$ are provided to N×M switch 700.

N×M switch 700 is advantageously capable of routing all of the bits of any information-bearing signal, $I_i(n)$, and the least significant bits of the associated conjugate pilot estimate, $P_i(n)$, from any of the N rake receiver fmgers to any of the M multipliers, 703-1 through 703-M, in well-known fashion. N×M switch 700 could be, for example, a space-division switch, a time-division switch or any combination of space-division and time-division switches, in well-known fashion. Advantageously, M≦N. Depending on the particular embodiment of the present invention, it will be clear to those skilled in the art how to select a value for M Each of the M multipliers, 703-1 through 703-M, advantageously has the same capacity, 8+8×4+4 bits.

Because not all of the information-bearing signal-conjugate pilot estimate pairs are multiplied with the same precision, switch controller 701 advantageously endeavors to ensure that those information-bearing signal-conjugate pilot estimate pairs with more fidelity are routed through N×M switch 700 to the more precise multipliers, 703-1 through 703-M. Advantageously, switch controller 701 accepts as input some or all of the most significant bits of all N of the conjugate pilot estimates on leads 609-1 through 609-N and analyzes them, in well-known fashion, to determine their relative fidelity.

For the reasons discussed above, the relative fidelity of each information-bearing signal can be reasonably and fairly estimated by analyzing its associated conjugate pilot estimate. Switch controller 701 then directs N×M switch 700 to route the most accurate information-bearing single-conjugate pilot estimate pair to the most precise multiplier, the next most accurate information-bearing signal-conjugate pilot estimate pair to the next most precise multiplier, etc.

Furthermore, it will be clear to those skilled in the art that multipliers 703-1 through 703-M can be pooled among multiple users and the output of the multipliers routed to a coherent combiner associated with that user. When multipliers 703-1 through 703-Mare pooled among multiple users, switch controller 701 can apportion the multipliers among the users based on, for example, a measure of the frame-error rate of the estimated signal, Î(n), for each user, or the user's desired level of channel quality, or a combination of the two, etc. In some embodiments in which multipliers 703-1 through 703-M can be pooled among multiple users, a second N×M switch (not shown) is interposed between multipliers 703-1 through 703-M and the respective combiners to ensure that the appropriate multiplier products are routed to the proper combiners. The second N×M switch advantageously performs the inverse routing of N×M switch 700 and can be also controlled by switch controller 701, in well-known fashion.

Illustrative Embodiment #3—Reconfigurable Multipliers

Figure 8:
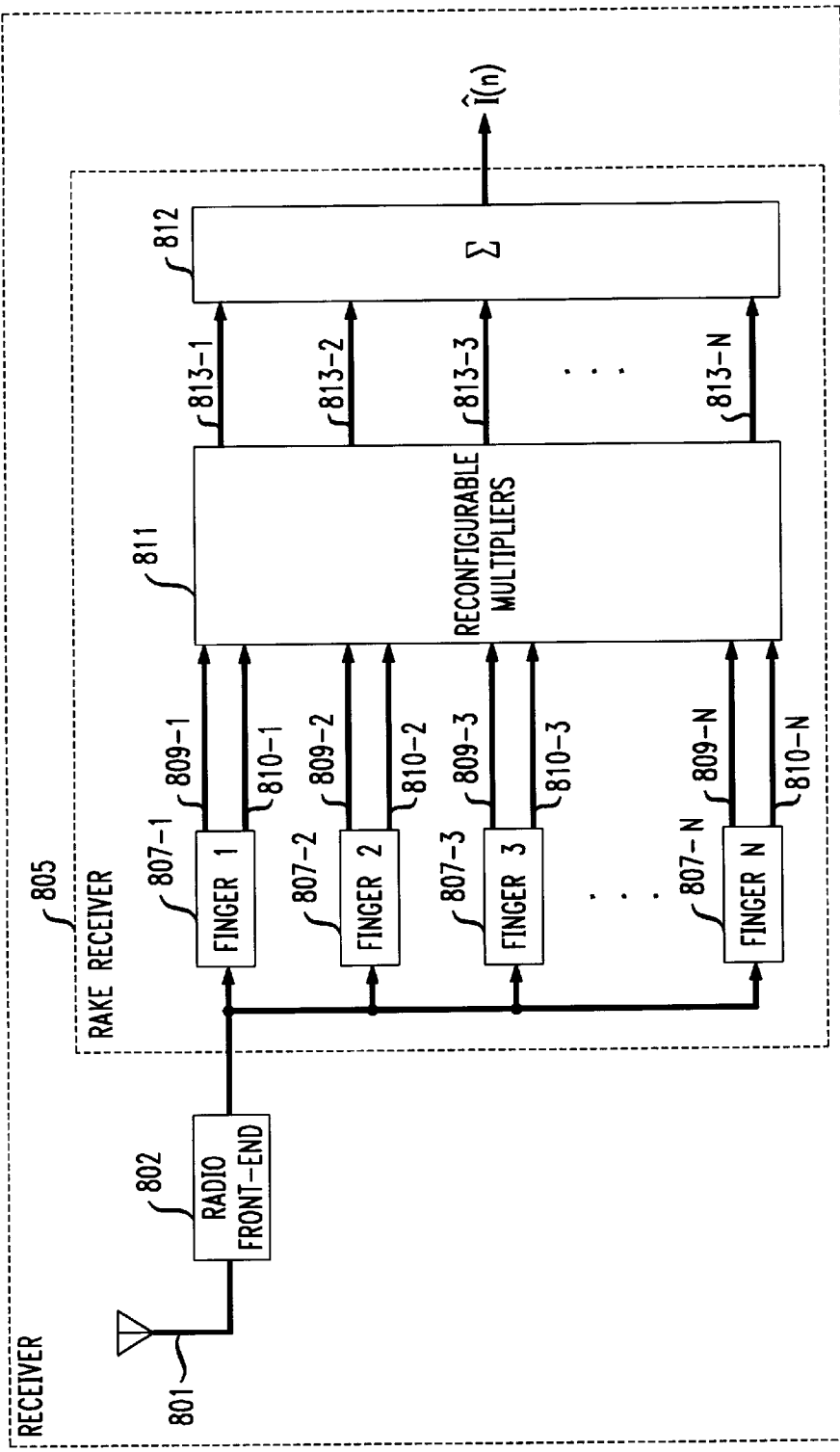
FIG. 8 depicts a block diagram of a pilot-aided CDMA rake receiver in accordance with the first illustrative embodiment of the present invention.

FIG. 8 depicts receiver 800 in accordance with the first illustrative embodiment of the present invention, which can be implemented in either a wireless terminal or in a wireless base station. Receiver 800 advantageously comprises: antenna 801, radio front-end 802 and rake receiver 805, which comprises: a bank of N rake receiver fingers, 807-1 through 807-N, Reconfigurable multiplier 811 and coherent combiner 812, interconnected as shown.

Antenna 801 advantageously receives a composite signal, in well-known fashion, and feeds the composite signal to radio front-end 802, which amplifies and down-converts it also in well-known fashion. The composite signal leaves radio front-end 802 and is received by rake receiver 805, which analyzes the composite signal, in well-known fashion, and assigns each of the strongest constituent signals in the composite signal to one of the N rake receiver fingers, 807-1 through 807-N, as in the above-described illustrative embodiments.

Each of the N rake receiver fmgers outputs an information-bearing signal, $I_i(n)$, and a conjugate pilot estimate, $P_i(n)$, in well-known fashion, for i=1 to N, wherein n indicates the temporal sequence of the received signals.

Reconfigurable multiplier 811 takes as input the N pairs of information-bearing signals, $I_i(n)$, and conjugate pilot estimates, $P_i(n)$, multiplies them, or at least parts of them, and outputs their respective products to coherent combiner 812, via leads 813-1 through 813-N, coherent combiner 812 combines the products, in well-known fashion, to produce the estimate, $\hat{I}(n)$, of the transmitted signal.

Figure 9:
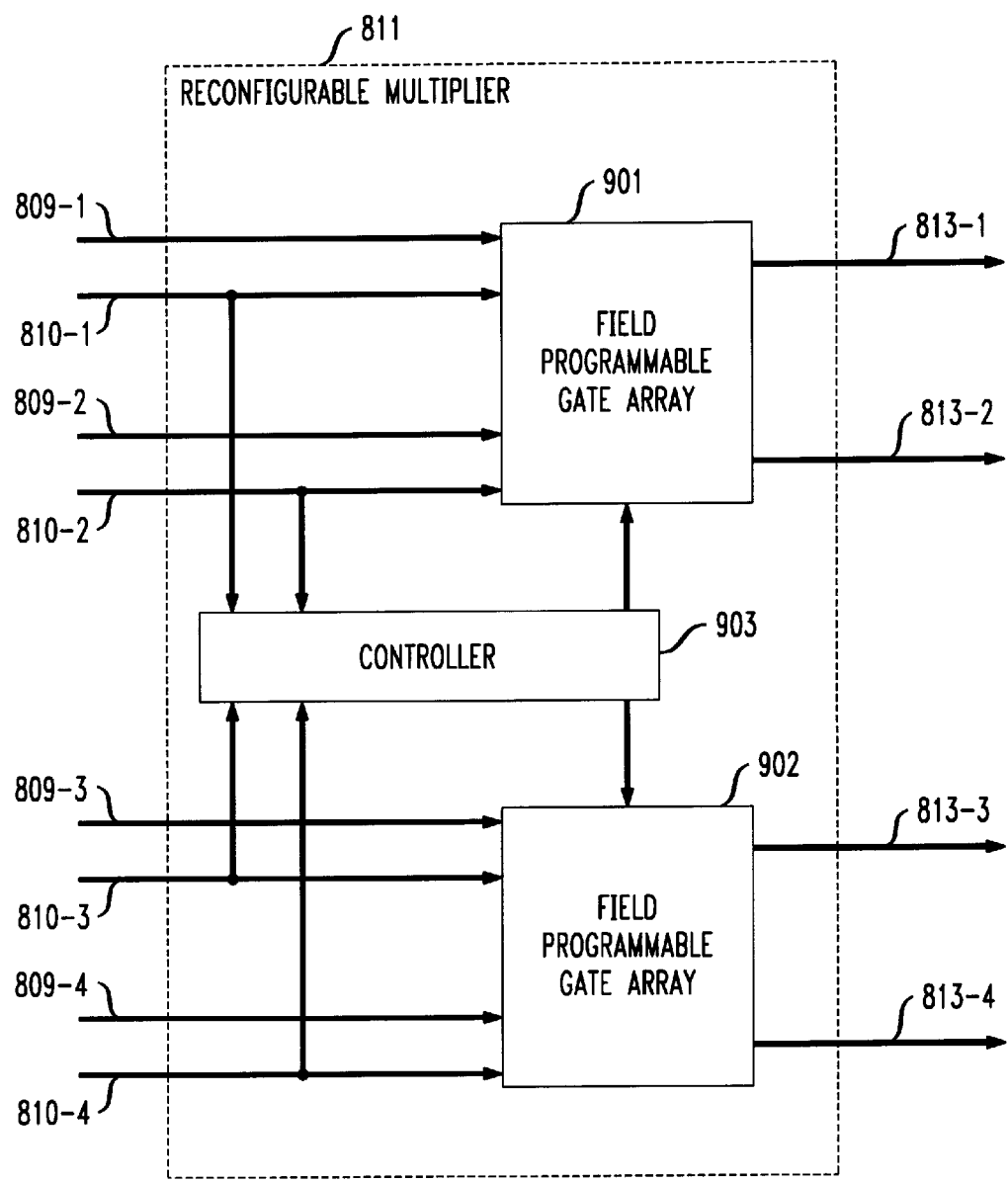
FIG. 9 depicts a block diagram of a reconfigurable multiplier in accordance with the pilot- aided CDMA rake receiver of FIG. 8.

FIG. 9 depicts a block diagram of the salient components of reconfigurable multiplier 811, which advantageously comprises: field programmable gate array 901, field programmable gate array 902, and controller 903. The illustrative embodiment of the present invention advantageously comprises one or more field programmable gate arrays, each of which accepts as input all of the bits for a plurality of the information-bearing signals, $I_i(n)$, and all of the bits of the associated conjugate pilot estimates, $P_i(n)$. In the illustrative embodiment, field programmable gate array 901 and 902 each accept all of the bits for a two of the information-bearing signals, $I_i(n)$, and all of the bits of the associated conjugate pilot estimates, $P_i(n)$.

Each field programmable gate array in the illustrative embodiment multiplies at least a portion of each of the information-bearing signals, $I_i(n)$, input to that gate array by at least a portion of its associated conjugate pilot estimate, $P_i(n)$, in well-known fashion, and outputs the products to coherent combiner 812.

A field programmable gate array is integrated circuit device that comprises a finite number of computational elements (e.g., NAND gates, adders, etc.) that can be programmed, and successively re-programmed to provide a fully custom computational resource. For example, field programmable gate array 901 comprises enough computational elements to make: (1) one 8×8 bit multiplier and one 4×4 bit multiplier, or (2) two 6×6 bit multipliers. Furthermore, field programmable gate array 901 can be programmed to comprise one 8×8 bit multiplier and one 4×4 bit multiplier one moment, re-programmed as two 6×6 bit multipliers the next moment, and then re-programmed again as one 8×8 bit multiplier and one 4×4 bit multiplier.

Therefore, field programmable gate array 901 can be programmed to multiply each pair of information-bearing signals, $I_i(n)$, and associated conjugate pilot estimates, $P_i(n)$, with a different degree of precision based on an estimate of the fidelity of each of the information-bearing signals, $I_i(n)$ input to that gate array. In other words, when the two information-bearing signals input to field programmable gate array 901 have approximately the same fidelity, then field programmable gate array 901 is advantageously programmed to function as two 6×6 bit multipliers. When, the relative fidelity of the two signals changes, then field programmable gate array 901 is advantageously reprogrammed as one 8×8 bit multiplier and one 4×4 bit multiplier, such that all of the bits of the more accurate information-bearing signal, $I_i(n)$, are multiplied by all of the bits of the associated conjugate pilot estimate, $P_i(n)$, with the 8×8 bit multiplier, but only the most significant bits of the less accurate information-bearing signal, $I_i(n)$, are multiplied by the most significant bits of the associated conjugate pilot estimate, $P_i(n)$, with the 4×4 bit multiplier. In other words, all of the computational elements in a single field programmable gate array are pooled, and successively re-distributed, among the information-bearing signal-conjugate pilot estimate pairs input to that gate array.

The function of field programmable gate array 902 is analogous to that of field programmable gate array 901.

Controller 903 advantageously receives all of the conjugate pilot estimates, $P_i(n)$, and analyzes them, in well-known fashion, to create an estimate of the fidelity of each of the information-bearing signals. Based on the relative estimates of fidelity, controller 903 then programs field programmable gate array 901 and 902 so as to allocate more of the computational elements in each array to comprising a more precise multiplier for the more accurate signals input to that array.

Furthermore, it will be clear to those skilled in the art that field programmable gate array 901 and 902 can be pooled among multiple users and the output of the multipliers routed to a coherent combiner associated with that user. When field programmable gate array 901 and 902 are pooled among multiple users, controller 903 can apportion the multipliers among the users based on, for example, a measure of the frame-error rate of the estimated signal, $\hat{I}(n)$, for each user, or the user's desired level of channel quality, etc.

What is claimed is:

1. An apparatus comprising:
   N rake receiver fingers, wherein an ith of said N rake receiver fingers outputs an ith information-bearing signal, $I_i(n)$, and a ith conjugate pilot estimate, $P_i(n)$, for i=1 to N; multipliers; and
   an N×N switch interposed between said N rake receiver fingers and said N multipliers for routing said ith information-bearing signal, $I_i(n)$, and said ith conjugate pilot estimate, $P_i(n)$, from said ith of said N rake receiver fingers to any of said N multipliers;
   wherein N is a positive integer greater than one and n is an integer.

2. The apparatus of claim 1 wherein each of said N multipliers has a capacity and at least one of said N multipliers has a capacity that is different than the capacity of another one of said N multipliers.

3. The apparatus of claim 1 wherein each of said N multipliers has a capacity and the capacity of each of said N multipliers is different than the capacity of the other N-1 multipliers.

4. The apparatus of claim 1 further comprising a controller for controlling the routing of said N×N switch based on said N conjugate pilot estimates.

5. The apparatus of claim 4 wherein each of said N multipliers has a capacity and each of said N conjugate pilot estimates has a signal quality and said conjugate pilot estimates with higher signal quality are routed to said multipliers with higher capacity.

6. A method comprising:
   creating N pairs of information-bearing signals, $I_i(n)$, and conjugate pilot estimates, $P_i(n)$, for i=1 to N, with N rake receiver fingers, wherein N is a positive integer greater than one and n is an integer;
   creating N pairs of information-bearing signals, $I_i(n+1)$, and conjugate pilot estimates, $P_i(n+1)$, for i=1 to N, with said N rake receiver fingers, wherein said information-bearing signal, $I_i(n+1)$, is created temporally after said information-bearing signals, $I_i(n)$, and said conjugate pilot estimate, $P_i(n+1)$ is created temporally after said conjugate pilot estimate, $P_i(n)$;

routing one pair of information-bearing signals, $I_i(n)$, and conjugate pilot estimates, $P_i(n)$, from one of said N rake receiver fingers to one of N multipliers; and routing one pair of information-bearing signals, $I_i(n+1)$, and conjugate pilot estimates, $P_i(n+1)$, from said one of said N rake receiver fingers to a second of said N multipliers.

7. The method of claim 6 wherein each of said N multipliers has a capacity and at least one of said N multipliers has a capacity that is different than the capacity of another one of said N multipliers.

8. The method of claim 6 wherein each of said N multipliers has a capacity and the capacity of each of said N multipliers is different than the capacity of the other N-1 multipliers.

9. The method of claim 6 wherein each of said N multipliers has a capacity and each of said N conjugate pilot estimates has a signal quality and said conjugate pilot estimates with higher signal quality are routed to said multipliers with higher capacity.

10. An apparatus comprising:

N rake receiver fingers, wherein an ith of said N rake receiver fingers outputs an ith information-bearing signal, $I_i(n)$, and a ith conjugate pilot estimate, $P_i(n)$, for i=1 to N, wherein N is a positive integer greater than one and n is an integer;

N primary multipliers, wherein each of said N primary multipliers is uniquely associated with one of said N rake receiver fingers and wherein each of said N multipliers has a first input, $A_i$, that receives at least a first portion of said information-bearing signal, $I_i(n)$, from the associated rake receiver finger and a second input, $B_i$, that receives at least a first portion of said conjugate pilot estimate, $P_i(n)$, from the associated rake receiver finger;

M secondary multipliers, wherein M is a positive integer greater than one; and an N×M switch interposed between said N rake receiver fingers and said M secondary multipliers capable of routing at least a second portion of said ith information-bearing signal, $I_i(n)$, and at least a second portion of said ith conjugate pilot estimate, $P_i(n)$, from said ith of said N rake receiver fingers to any of said M secondary multipliers, wherein N≧M.

11. The apparatus of claim 10 further comprising a controller for controlling the routing of said N×M switch based on said N conjugate pilot estimates.

12. The apparatus of claim 10 wherein each of said N multipliers has a capacity and the capacity of each of said N multipliers is the same, and wherein each of said M secondary multipliers has a capacity and the capacity of each of said M secondary multipliers is the same.

13. The apparatus of claim 10 wherein each of said N conjugate pilot estimates has a signal quality and said conjugate pilot estimates with higher signal quality are routed through said N×M switch one of said M secondary multipliers.

14. A method comprising:

creating N pairs of information-bearing signals, $I_i(n)$, and conjugate pilot estimates, $P_i(n)$, for i=1 to N, with N rake receiver fingers, wherein N is a positive integer greater than one and n is an integer;

routing at least a first portion of one of said information-bearing signals, $I_i(n)$, and at least a first portion of one of said conjugate pilot estimates, $P_i(n)$, from one of said N rake receiver fingers to one of N primary multipliers;

routing at least a second portion of said one of said information-bearing signals, $I_i(n)$, and at least a second portion of said one of said conjugate pilot estimates, $P_i(n)$, from said one of said N rake receiver fingers to one of M secondary multipliers, wherein M is a positive integer greater than one.

15. The method of claim 14 further comprising multiplying said second portion of said one of said information-bearing signals, $I_i(n)$, by second portion of its paired conjugate pilot estimate, $P_i(n)$, with said one of said M secondary multipliers.

16. An apparatus comprising:

a plurality of rake receiver fingers, each of which generates an information-bearing signal, $I_i(n)$, and an associated conjugate pilot estimate, $P_i(n)$, for i=1 to N, wherein N is a positive integer greater than one and n in an integer;

a field programmable gate array for accepting each of said information-bearing signals, $I_i(n)$, and said associated conjugate pilot estimates, $P_i(n)$, and for multiplying at least a portion of each of said information-bearing signals, $I_i(n)$, by at least a portion of its associated conjugate pilot estimate, $P_i(n)$; and a controller for estimating a fidelity of each of said information-bearing signals, $I_i(n)$, and for re-programming said field programmable gate array based on said estimates of fidelity.

17. The apparatus of claim 16 wherein said estimates the fidelity of each of said information-bearing signals, $I_i(n)$, are based on said associated conjugate pilot estimates, $P_i(n)$.

18. A method comprising:

creating N pairs of information-bearing signals, $I_i(n)$, and conjugate pilot estimates, $P_i(n)$, for i=1 to N, wherein N is a positive integer treater than one and n is an integer;

multiplying at least a portion of each information-bearing signal, $I_i(n)$, by at least a portion of its paired conjugate pilot estimate, $P_i(n)$, with at least a portion of a field programmable gate array;

estimating a fidelity of each information-bearing signal, $I_i(n)$; and re-programming said field programmable gate array based on said estimates of fidelity.

19. The method of claim 18 wherein said estimates the fidelity of each of said information-bearing signals, $I_i(n)$, are based on said associated conjugate pilot estimates, $P_i(n)$.

20. The method of claim 18 wherein said portion of each information-bearing signal, $I_i(n)$, is based on said estimates of fidelity.

21. The method of claim 18 wherein said portion of its paired conjugate pilot estimate, $P_i(n)$, is based on said estimates of fidelity.

* * * * *